Figure 1:
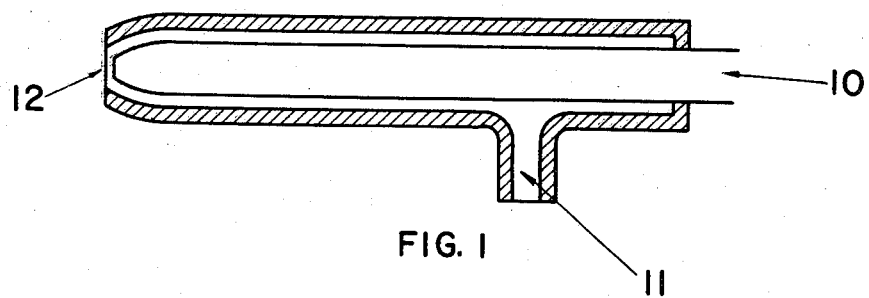

April 14, 1964  J. F. GALL  3,128,824
CHEMICAL CUTTING AND WORKING
Original Filed May 18, 1959

JOHN F. GALL
INVENTOR.

BY Emil W. Milan
ATTORNEY

United States Patent Office 3,128,824
Patented Apr. 14, 1964

3,128,824
CHEMICAL CUTTING AND WORKING
John F. Gall, Narbeth, Pa., assignor to Pennsalt Chemicals Corporation, Philadelphia, Pa., a corporation of Pennsylvania
Original application May 18, 1959, Ser. No. 813,662, now Patent No. 3,066,058, dated Nov. 27, 1962. Divided and this application Apr. 7, 1961, Ser. No. 108,698
13 Claims. (Cl. 166—35)

This invention relates to a new method for perforating, cutting, welding, shaping, burning, disintegrating, or otherwise altering the form of a structure, particularly a ferrous metal structure, and to devices for carrying out these operations, and to a new oxidant in which a fuel is burnt.

This application is a division of application Serial No. 813,662 filed May 18, 1959, and now Patent No. 3,066,058, which in turn is a continuation-in-part of application Serial No. 564,830 filed February 10, 1956, and now abandoned.

Chemicals for high temperature cutting operations commonly include a fuel such as hydrogen or a hydrocarbon which is reacted with an oxidant such as gaseous oxygen. For example, hydrogen and acetylene torches employing oxygen as the oxidant are well known, and in Watkins Patent 2,571,636 of October 16, 1951, an oxygen-charged tool is described for melting or burning metal obstructions out of oil wells.

Oxygen is disadvantageous as the oxidant for many applications because it exists only as a gas at ordinary temperatures and large containers are therefore required for the supply that is usually needed. Alternatively, oxygen can be stored as a liquid at very low temperatures, but with all the inconvenience and expense of continuous low temperature refrigeration. Moreover, oxygen is fairly dangerous to handle since under pressure, or in the liquid form, it may explosively unite with many organic materials. In an application like the Watkins tool, oxygen has the further disadvantage of requiring what amounts to a second separate chemical device, for example, a thermite bomb, in order to attain the ignition temperature required for the oxygen to burn and melt the obstruction.

More reactive oxidants have also been proposed for chemical cutting and welding tools. Priest et al. Patent No. 2,421,649 of June 3, 1947, for example, describes a fluorine-hydrogen torch for welding copper, and Grosse Patent No. 2,642,656 of June 23, 1953, describes a similar torch for which the oxidant is a chlorine fluoride such as chlorine trifluoride (ClF$_3$).

Oxidants like fluorine and chlorine trifluoride have the disadvantage of being even more dangerous to handle than oxygen. If these materials come in contact with an organic material, or even water, they react so violently as to ignite nearby materials, including steel containers, with explosive violence. Moreover, they can, under some circumstances, support the combustion of copper and other metals as well as steel. Hence there is a problem of material of construction for the portions of a tool in contact with fluorine or chlorine trifluoride under high temperature conditions.

I have now found a new oxidant for chemical cutting and shaping operations, and for other uses, which is safer and easier to handle than oxygen, fluorine or chlorine trifluoride. This oxidant is more convenient than oxygen since it can be maintained as a liquid under moderate pressure at ordinary temperatures and hence, for applications like that described in the Watkins patent, for example, a smaller and more compact tool is possible; moreover, no second chemical device such as Watkins' thermite bomb is needed, although a small amount of an igniter may sometimes be helpful, as described below.

The oxidant of my present invention is a perhalogenyl fluoride, i.e., a chemical of structure

where X may be chlorine, bromine, or iodine, which, as the above structure shows, is in its heptavalent state. My preferred material is perchloryl fluoride. Perchloryl fluoride, ClO$_3$F, is a colorless gas at ordinary temperatures. When liquefied, it boils at −47.5° C. at 760 mm. pressure. It solidifies to a white crystalline solid at −146° C. The gas is thermally stable even when heated in a glass container to the softening point of the glass. The stability of perchloryl fluoride is particularly remarkable when compared with other chlorine oxyfluorides. Chloryl fluoride (ClO$_2$F), for example, reacts with explosive violence with water and reacts with glass at room temperature. Fluorine perchlorate (FClO$_4$) decomposes explosively even at −80° C., its melting point.

Chemically, perchloryl fluoride is a strong oxidant which vigorously supports combustion, but which, surprisingly, does not spontaneously ignite many common organic materials as readily as do other strong oxidants like oxygen. Thus, perchloryl fluoride is safer to handle than oxygen.

Importantly, it possesses the added advantages of having relatively low pressures at ordinary temperatures (about 150 p.s.i.g. at 75° F.) and of being capable of permanent storage as a liquid in ordinary steel cylinders without loss or deterioration. Its physical and chemical properties thus make perchloryl fluoride a remarkably useful and valuable material for cutting and altering solid structures.

In practicing the present invention, particularly in cutting and perforating solid objects, the perhalogenyl fluoride may be positioned or directed directly against the object, and the portion of the object with which the perhalogenyl fluoride comes in contact can then act as the fuel, with the result that the object is cut or pierced; or there may be a small amount of an igniting material (described below) provided in the area where cutting is desired, and once this is spontaneously ignited by the perhalogenyl fluoride the object being cut will begin to undergo combustion and act as fuel; or the perhalogenyl fluoride may be first mixed with a fuel other than the object being cut and the heat from the burning of the fuel used to melt, and thus cut or pierce the object.

Many materials will rapidly burn in the presence of perhalogenyl fluoride. Moreover, the high temperature of combustion that is produced results from reaction of the halogen atoms of the perhalogenyl fluoride with the combustible material as well as from reaction of its oxygen atoms with the material. The term fuel therefore includes all materials which burn in an atmosphere containing either halogen or oxygen or both. Examples of such combustible materials are hydrogen; ammonia; hydrazines; carbon compounds, particularly alkyl and aryl hydrazines, alcohols, mercaptans, ketones, ethers, and hydrocarbons, e.g., acetylene, ethane, propane, and hexane; carbonaceous materials of all kinds, e.g., wood, coal, coke, carbon, cellulosic fibers, and synthetic polymers; alkali metals, e.g., lithium, sodium and potassium; alkaline earth metals, e.g., beryllium, magnesium, calcium, strontium, and barium; aluminum; iron; phosphorus and its lower valence compounds; sulfur, boron; silicon; and hydrides and alkyls of the listed chemical elements. In many cases, the ignition temperatures of these fuels are quite moderate in perhalogenyl fluoride in comparison to those in an oxygen atmosphere.

When the object to be cut or worked is made of a combustible material, a separate fuel besides the igniter material is usually not required to bring the object to a self-sustaining ignition temperature. However, if the object is made of a non-combustible material such as stainless steel, nickel alloys, copper, concrete, stone, etc., it is necessary to supply a separate fuel, such as acetylene, fuel gas, powdered charcoal, hydrazines, alcohol, or other combustible material of the class listed above.

It is frequently found that when the perhalogenyl fluoride is contacted with a solid surface of a material readily ignitible at slightly elevated temperatures that ignition will not occur at ordinary temperatures. This is a useful property since it permits the storage and shipment of the perchloryl fluoride in containers of ignitible material such as iron. However, as disclosed above, these materials can readily be ignited if first heated or if the perchloryl fluoride is first brought into contact with an igniting agent such as activated carbon, powdered charcoal, oil, steel wool, hydrazines, etc.

This igniting agent may be placed in an orifice or chamber in the tool used or may be placed on the surface of the object being cut, or may be fed to the combustion zone along with or just ahead of the perhalogenyl fluoride.

Figure 2:
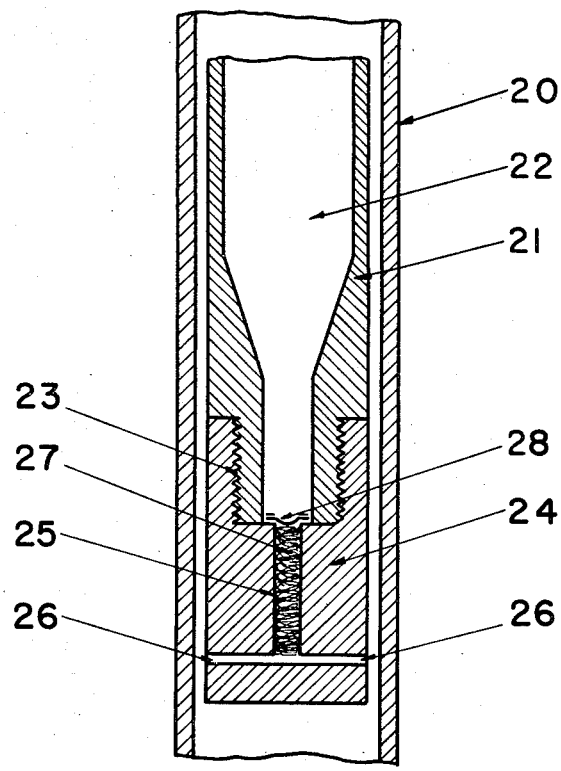

In the drawings, the figures show two illustrative tools that can be used for the practice of my invention. FIGURE 1 shows a cutting or welding torch. FIGURE 2 shows a chemical perforating or cutting tool useful, for example, to perforate or cut the casing of an oil well at depths ranging up to several miles. Other applications will be referred to hereinbelow.

In FIGURE 1 of the drawing reference numeral 10 denotes an inner nozzle for a cutting or welding torch serving as a conduit for a perhalogenyl fluoride, preferably perchloryl fluoride. The perhalogenyl fluoride is supplied to 10 through conventional hoses and other conduits from a suitable cylinder in which the material is stored. Reference numeral 11 denotes in vertical cross-section an outer nozzle which serves as a conduit for the fuel, which may be hydrogen, a hydrocarbon such as acetylene, a hydrazine, an alcohol, a stream of powdered charcoal, or the like. Conventional hoses and other conduits are also employed to bring the fuel to nozzle 11. The fuel merges with the stream of perhalogenyl fluoride at 12, which upon ignition provides a cutting or welding flame. Conventional auxiliary elements such as handles and supports, not shown, are employed.

In FIGURE 2, reference numeral 20 denotes a segment of a casing of an oil, gas or water well shown in vertical cross-section. In this casing is suspended a tool for perforating or cutting the casing. The lower segment of this tool is shown in vertical cross-section at 21. The main part of this tool is a chamber 22 which contains perhalogenyl fluoride, preferably perchloryl fluoride in liquified form under about 150 pounds pressure. The portion of the tool forming the chamber 22 terminates in the reduced threaded section 23 which is screwed into the cutting head 24. This cutting head has a vertical passage 25 connecting with a plurality of horizontal passages 26. For some applications, in this vertical passage 25 (and/or, if desired, in passages 26) is an igniter 27, which may, for example, be steel wool, preferably impregnated with oil or powdered charcoal, or may be any easily ignited organic material. Blocking the connection between passage 25 and chamber 22 is a rupture plate or check valve 28. Passages 26 also contain plugs, rupture discs or other means (not shown) to prevent well fluid from seeping into the igniter as the tool is being lowered into the well. Above the chamber 22, but not shown here, is some conventional means for applying pressure to the perchloryl fluoride in chamber 22. This may consist of a piston, for example, operated by an explosive charge above it. The entire tool, including the portion 21, the piston and its housing, and the chamber for the explosive charge are, as a unit, suspended in the oil well casing by conventional means, e.g., a cable, such that the openings 26 are at the point where perforation or cutting of the casing is desired. Whether a cut or separated perforations are obtained depends upon how closely spaced the openings 26 are around the periphery of the cutting head.

To operate the tool, the explosive charge is fired, forcing perchloryl fluoride through the passage 25 where the igniter is positioned. The perchloryl fluoride sets fire to this igniter; the hot gases and hot solid and molten particles are ejected through the openings 26 with additional perchloryl fluoride, and the desired perforation in casing 20 is obtained by burning and/or melting the metal where the hot perchloryl fluoride stream impinges.

Generally the cutting head is made of copper, nickel, Monel, or stainless steel, since in contrast to an atmosphere consisting largely of hot $ClF_3$ these metals are unaffected or little affected even by a very hot perchloryl fluoride atmosphere.

In some applications, where the casing is already coated with an easily ignited organic material and the well is at a somewhat elevated temperature (e.g., 150° C.), an igniter may not be needed since, unlike the teaching of the Watkins patent that temperatures of the order of 3800–4200° C. are needed for oxygen to initiate the desired burning of metal, perchloryl fluoride supported combustion is readily initiated at moderate temperatures.

While the tool of FIGURE 2 has been described as employed for cutting or perforating, the casing of an oil well, by obvious variations in the designs of the openings 26 it can similarly be employed for perforating, burning, and other operations altering the form of structures, particularly ferrous metal structures, in oil, gas, and water wells. Some examples of these are:

A. During the drilling or reworking of an oil well, it often becomes necessary to cut and remove tubing, casing, or drill pipe. For instance, if part of the well bore collapses on the tube used to conduct oil to the surface, the tube must be cut just above the bound point, and removed preparatory to repair of the damage.

B. In an old well it may be desired to begin withdrawing oil from a higher oil stratum. To do this it is necessary to cut the tubing, elevate it to the new stratum, and seal the lower end of the well with cement. The tubing and casing can then be perforated at the new level and more oil produced from the oil well.

C. In completing a well, casing is set through the oil-bearing formation and its end sealed with cement. The steel casing must then be perforated to allow oil to enter the well from the oil-bearing formation.

D. Often metal objects such as broken drilling bits, drill pipe, etc., become lodged in the well bore, and must be destroyed before drilling can be continued.

E. In drilling a well, it is important that the circulation of mud fluid down through the drill pipe and bit, and back up through the well bore, never cease. When stone chips or other detritus block the movement of fluid at any point, it becomes urgently necessary to perforate through the drill pipe to establish a new circulation route.

A particularly desirable mechanical design for a tool for use in oil, gas, and water wells, when charged with my new oxidant, is described in copending William G. Sweetman applications which describe and claim tools of this character charged with a halogen fluoride such as chlorine trifluoride as the oxidant.

Devices embodying my invention are also useful for perforating, melting, burning, or otherwise modifying the form of a structure by means of high temperatures in applications other than wells where the operator is remote from the working area or when, for some reason, access to this area is difficult. For example, in building or salvaging operations, where the structure is complex, a tool embodying the principles of my invention can be let down or extended or inserted and the operation carried out from a distance.

In using the perhalogenyl fluoride for altering the form of a structure, it is not always necessary that a stream of the fluoride impinge upon the structure. Instead, a body of the perhalogenyl fluoride may be brought to the desired area and there positioned in the area where modification of the structure is desired and thereafter be brought into chemically reactive contact with a fuel. The fuel may even be pre-mixed with the perhalogenyl fluoride, for example in the form of an explosive device. Mixtures of a perhalogenyl fluoride with charcoal have been found to be reasonably stable under ordinary conditions but will explode when subjected to shock. An explosive device can therefore be made by mixing perchloryl fluoride with powdered charcoal, activated carbon, wood flour, or other fuel, and enclosing the mixture in a housing. This device can be positioned where destruction of a structure is desired, for example, in quarrying, construction, or razing operations, and the mixture in the device can be detonated by applying pressure as from a piston or a priming explosive charge. A particularly advantageous explosive device can be made by using two concentric containers, the inner one filled with powdered charcoal and a priming explosive charge, the other outer container filled with perchloryl fluoride. Firing the priming charge would then cause the two materials to mix and explode.

Under some conditions where a dry ignition system cannot readily be used, as in cutting and working under water, and under still other conditions where hypergolic ignition is required to produce a flame, although not necessarily to be used to alter the form of a structure, e.g., in rocket motor firing, the perhalogenyl fluoride can be mixed with a gaseous or liquid material which promotes hypergolic ignition of a combustible material under the conditions of use. Advantageous hypergolic ignition promoting materials are the halogen fluorides, e.g., chlorine trifluoride, bromine trifluoride, or bromine pentafluoride; fluorine; and chloryl fluoride ($ClO_2F$). Chlorine trifluoride is especially preferred because it is miscible with the perhalogenyl fluoride in all proportions even at temperatures as low as about —75° C. and is less hazardous than fluorine. Chloryl fluoride sometimes is economically preferred since it is a co-product in some ways of manufacturing perchloryl fluoride.

In a cutting or burning operation where an auxiliary fuel is not needed, the perhalogenyl fluoride and the hypergolic ignition promoting material may be mixed in a torch having two inlets, as in FIGURE 1, and impinged on the material to be worked. After ignition takes place, the flow of hypergolic ignition promoting material can be shut off and the burning can be propagated with the perhalogenyl fluoride alone. If a welding or forming operation is to be carried out, the torch can be provided with an additional inlet for a gaseous fuel, e.g., acetylene or propane. The torch can then be ignited by starting the flow of the hypergolic ignition promoting material, e.g., chlorine trifluoride, then starting the flow of fuel which thereupon ignites spontaneously in the mixed gas streams and then starting the flow of perhalogenyl fluoride, e.g., perchloryl fluoride. The flow of hypergolic ignition promoting material is then shut off and the perhalogenyl fluoride-fuel flame is used for the welding or forming operation. Where danger of extinguishment of the flame exists, a small stream of the hypergolic ignition promoting material can continuously be fed into the gas stream.

The need for an auxiliary feed inlet in the torch and for a supply container for the hypergolic ignition promoting material, which are required in the above procedure, can be eliminated by still another embodiment of this invention wherein the hypergolic ignition promoting material is directly introduced into and mixed with the perhalogenyl fluoride in a supply container. For example, a perhalogenyl fluoride-hypergolic ignition promoting material mixture which will ignite spontaneously on contact with water or with an igniter or fuel of the type described above is formed by blending at least about 4 parts by weight of halogen fluoride, fluorine, or chloryl fluoride with 100 parts of perhalogenyl fluoride. Preferably, no more hypergolic ignition promoting material is used in this embodiment of the invention than is necessary to ensure positive ignition of the combustible material. A mixture containing from about 5 to 10 parts by weight of halogen fluoride to 100 parts of perhalogenyl fluoride is especially preferred.

However, where complete combustion of an added fuel, e.g., unsymmetrical dimethylhydrazine in a rocket motor, is desired to obtain a flame producing a maximum thrust from its combustion gases and a minimum of fouling from unburned carbon or metallic particles, the amount of the halogen fluoride, chloryl fluoride, or fluorine to the perhalogenyl fluoride can be set at a predetermined ratio wherein the balance of carbon atoms in the fuel and of oxygen atoms in the perhalogenyl fluoride are such that all the carbon is converted to an oxide, for example, to carbon monoxide or carbon dioxide. The composition of the oxidizer can be more precisely adjusted to give maximum rocket performance, as calculated by the usual equations for specific impulse or density impulse, or whichever criterion is applicable to the task at hand. When a metal hydride, e.g., boron hydride, is used as the fuel, the ratio of the perhalogenyl fluoride-hypergolic ignition promoting material mixture can be similarly adjusted to provide the best ratio of halogen to oxygen for best engine performance. The ratio of perhalogenyl fluoride to the hypergolic ignition promoting material in the mixture can range from about 24:1 to about 1:5. A mixture containing from about 25% to about 50% by weight of perhalogenyl fluoride is preferred. After the composition to the hypergolic ignition promoted perhalogenyl fluoride oxidant has been calculated for a particular fuel, the oxidant-fuel ratio can be calculated to give the desired optimum flame using known methods.

In underwater cutting or working operations, such as might be encountered, for example, in salvage work on sunken vessels, the torch of FIGURE 1 is advantageously used with a perhalogenyl fluoride-halogen fluoride ignition promoted mixture as previously described above. The use of this novel liquid oxidant mixture in conjunction with a suitable liquified fuel, e.g., propane, provides an efficient, compact flame source for cutting and welding under severe and remote conditions. The oxidant and fuel may be fed to the underwater torch through lines from a surface vessel or they may be carried below the water in suitable weighted supply tanks.

The field of ramjet motor operation provides still another application in which the perhalogenyl fluoride-halogen fluoride mixture is particularly useful. Through use of the mixture of this invention, hypergolic ignition of the fuel in a ramjet motor and subsequent propagation of the flame without danger of flameout is effectively achieved. As the hypergolic ignition promoted-oxidant mixture is a liquid at ambient temperatures, no need exists for an elaborate cooling and charging system of the type required when liquid oxygen is used. The novel mixture is easily stored in the supply containers ready for immediate use. Upon contacting a fuel, the resulting fuel-hypergolic ignition promoted oxidant mixture instantly ignites it and propagates a steady flame.

The perhalogenyl fluoride-hypergolic ignition promoted mixture, for example, a mixture of 10 parts of chlorine trifluoride in 100 parts by weight of perchloryl fluoride, can also be used in the tool of FIGURE 2 with or without the auxiliary igniter 27. The vapor pressure of the above perchloryl fluoride-chlorine trifluoride mixture is somewhat lower than that of the perchloryl fluoride alone, thus providing an additional advantage under certain conditions where lower working pressures are desirable.

The following examples are illustrative of the device and process of my invention:

*Example 1*

A device of the type shown in FIGURE 2, of about one inch outside diameter, was filled with 440 grams of liquid perchloryl fluoride. About 2 grams of steel wool covered with lubricating oil and powdered charcoal were placed in the ignition chamber 25. To simulate a well casing, a short section of a two-inch steel tube was clamped concentrically around the cutting head. A charge of 500 grains of black powder and an electric cap were loaded in the explosive chamber above the perchloryl fluoride. This assembly was lowered on a cable 250 feet in a test well filled with water. Upon firing the explosive charge the perchloryl fluoride was ejected through the ignition chamber onto the 2" tubing. In less than a second the tubing was cut. Only about one-half the reaction was noted on the surface of the well as is observed with a conventional charge of chlorine trifluoride. When the target tube was examined it was found that a cut superior to that made by 600 grams of chlorine trifluoride had been produced.

*Example 2*

A stream of perchloryl fluoride gas was directed through a nozzle onto a sheet of clean steel at room temperature. There was no ignition. Thereafter, a small amount of steel wool containing charcoal was placed on a line on a steel plate where a cut was desired. The perchloryl fluoride gas stream was directed at this line, the steel wool, charcoal, and the steel sheet ignited, and the sheet metal was cut.

In an alternative mode of operation, the sheet of steel may be heated up to its ignition temperature in perchloryl fluoride (about 600° C.) and when the perchloryl fluoride gas stream is directed at the steel, a cut is made without a separate igniter.

When the same experiment was performed using a copper sheet, no cut was made. This ability to cut steel and not copper is of great importance in designing tools for the more difficult oil well cuts.

*Example 3*

One gram of liquid perchloryl fluoride was charged into a hole in a steel block, cooled to −80° C. To this was added .2 gm. of powdered charcoal. A piston was loosely placed in the hole without displacing the liquid. When shock was applied to the liquid through the piston the mixture exploded, ejecting the piston with great force.

Following procedures as described above, the same results may be accomplished with perbromyl fluoride and in some cases with periodyl fluoride. In general, the ignition temperature (minimum temperature at which spontaneous ignition takes place under ambient conditions), for a given igniter, will be a little higher for perbromyl fluoride than for perchloryl fluoride, and a little higher for periodyl fluoride than for perbromyl fluoride.

*Example 4*

A gaseous stream of perchloryl fluoride was directed through a nozzle onto a wad of cotton batting supported on charred cork at an ambient temperature and pressure. There was no ignition. Thereafter, a gaseous stream of perchloryl fluoride-chlorine trifluoride mixture containing about 7% by weight of chlorine trifluoride was directed against the cotton and cork. Both the cotton and the cork burst into flame immediately. The amount of chlorine trifluoride was gradually reduced to find a minimum ignition promoting concentration. The limit under these conditions was found to be about 4%. The operation was repeated with first fluorine, then chloryl fluoride, and then bromine pentafluoride substituted for chlorine trifluoride. Hypergolic ignition resulted in each case.

*Example 5*

A torch of the type described in FIGURE 1 is connected by a hose line from inlet 11 to a storage tank containing a perchloryl fluoride-chlorine trifluoride mixture in a 10:1 ratio by weight. The other inlet, 10, of the torch is connected to a storage tank containing liquified propane. The torch is submerged in a tank of water. A small flow of the oxidant mixture is started and then a small flow of propane is started. The propane ignites upon contact with the oxidant stream. The gas flows are adjusted to the desired flame volume and heat intensity by manipulation of the flow control valves. A clean, soot-free high temperature flame is obtained. The flame is directed against a ¼" thick steel plate submerged under water. The plate is heated to a red glow. The propane is gradually cut off and the oxidant stream is continued to be directed against the steel plate. The steel plate burns and is perforated in the oxidant stream. The iron halides formed as the products of combustion dissolve in the water in the turbulence caused by the gases of the combustion. In some instances it is beneficial to maintain a bubble of non-condensible or insoluble gas at the point of action of the cutting flame and this can be achieved by incorporating an inert gas like carbon dioxide or sulfur hexafluoride in the oxidizer composition.

*Example 6*

A stream of hypergolic ignition promoted oxidant mixture consisting of about 40 parts by weight of perchloryl fluoride with about 60 parts of chlorine trifluoride is fed into the combustion chamber of a rocket motor at a determined flow rate. Simultaneously, a stream of unsymmetrical dimethylhydrazine (UDMH) is fed into the chamber in an amount such that the number of atoms of carbon in the UDMH is from one-half to one times the number of atoms of oxygen in the perchloryl fluoride to ensure complete combustion of the carbon to oxides. Ignition is instantaneous upon contact of the two streams. The combustion gases are soot-free and provide a high thrust for driving the engine.

*Example 7*

UDMH ignites with some difficulty in perchloryl fluoride alone. However, when the perchloryl fluoride has blended into it from about 1% to about 8% its weight of chloryl fluoride, the resulting mixture is hypergolic and instantly ignites the UDMH. Following the procedure of Example 6, 2.5 parts by weight of a perchloryl fluoride-chloryl fluoride mixture containing 5% by weight of chloryl fluoride ignites UDMH hypergolically. The resulting flame produces a specific impulse of 274 seconds at 600 p.s.i.a. chamber pressure expanding under frozen equilibrium to sea level pressure.

*Example 8*

A gaseous stream of hypergolic ignition promoted oxidant mixture consisting of 23 parts by weight of perchloryl fluoride with 2 parts of fluorine is prepared by simultaneously feeding the two oxidants in the desired ratio into the combustion chamber of a rocket motor. Simultaneously a stream of boron hydride is fed into the chamber in an amount such that the ratio of the boron atoms in the boron hydride is about 1 to 3% by mol less than the oxygen atoms in the perchloryl fluoride. Ignition is instantaneous upon contact of the fuel and oxidant streams. The combustion gases provide a high thrust for driving the engine.

The term "altering the form of a structure" as used herein is intended to include perforating, cutting, welding, shaping, burning, disintegrating, and the like. "Perforating," where used in the claims, includes cutting and may involve either melting or burning the structure or both.

The term "fuel" as used herein is used in its conventional sense to denote materials that burn in an oxygen atmosphere, either air or pure oxygen or in a halogen atmosphere, at either the initially ambient temperature or at the temperature later attained. Such materials are fully disclosed in the prior art and include, but without limitation:

(a) At ordinary temperatures: highly combustible materials such as acetylene, or hydrazine, and less combustible organic materials in finely divided form, e.g., powdered charcoal, an oil mist, powdered iron, etc.

(b) At the elevated temperatures attained when more active fuels are burning: all ferrous metals, in bulk or other form.

The term "fuel" is intended to include the auxiliary igniter, when one is used, and to include such portion of the structure as is consumed. The term "igniter" or "igniting material" as used herein denotes a fuel that spontaneously ignites under ambient conditions, or conditions readily attained (e.g., by detonation). Usually but not necessarily these are fuels of large surface area.

The term "hypergolic ignition promoting material" as used herein denotes a material which is inert to perhalogenyl fluoride but which spontaneously ignites a fuel and supports its combustion. The term "hypergolic" as ordinarily used in rocketry and as used herein with reference to rocketry, applies to propellant systems which are self-igniting.

As is shown in Example 6, the hypergolic ignition promoting material will under certain material balances of oxidant to fuel exceed the amount of perhalogenyl fluoride used. In such an embodiment of the invention, the excess amount of the former material serves as an adjustable source of halogen atoms which with the halogen and oxygen atoms of halogenyl halide permit a wide variation of the halogen-oxygen content of the hypergolic oxidant mixture with respect to any particular fuel. Thereby the fullest advantage is obtained from the perhalogenyl fluoride as an oxidant and of the hypergolic ignition promoting oxidant material as both an oxidant and a hypergolicity promoting agent.

The fuel and/or the igniter may be associated with the perhalogenyl fluoride in various ways. For example, in the absence of a hypergolic ignition promoting material, they may be in intimate admixture as in the case of the charge for the explosive device and the spontaneous ignition brought about by detonation, or, as in many of the other devices described, the perhalogenyl fluoride and the fuel and/or igniter may be separated by an easily ruptured film. When both igniter and a principal fuel are used, the igniter may be mixed with the other fuel or the perhalogenyl fluoride may be mixed with the other fuel and the igniter brought into chemically reactive contact to bring about ignition. All three elements may be separate and brought at one time or in sequence into chemically reactive contact, or the igniter may be more closely associated either with the fuel or conversely with the perhalogenyl fluoride. When the perhalogenyl fluoride is ejected as a stream, an igniter and/or fuel may be ejected simultaneously or in sequence or may have been pre-positioned in the area where the chemical reaction is desired. Similar appropriate arrangements can be carried out with a fuel-perhalogenyl fluoride-hypergolic ignition promoting material system.

Many widely different embodiments of this invention may be made and many process variables obvious to those skilled in the art may be introduced without departing from the scope and spirit thereof and it is to be understood that my invention includes all such embodiments and is not to be limited by the above description.

I claim:

1. A method for altering the form of a structure comprising supplying a perhalogenyl fluoride to the area of said structure where said alteration is desired and bringing the perhalogenyl fluoride into chemically reactive contact with a fuel in said area.

2. The method of claim 1 in which the perhalogenyl fluoride is perchloryl fluoride.

3. A method for perforating a ferrous metal structure in a well comprising supplying a stream of a perhalogenyl fluoride to the area of said structure where said perforation is desired, and bringing the perhalogenyl fluoride into chemically reactive contact with a fuel in said area.

4. The method of claim 3 in which the perhalogenyl fluoride is perchloryl fluoride.

5. The method of claim 4 in which the fuel is at least in part an igniting material of large surface area.

6. The method of claim 2 in which a perforation is made in a steel plate to which the perchloryl fluoride and a gaseous fuel are supplied in a merged and ignited gas stream directed at the plate.

7. The method of claim 2 in which an ignition chemical is pre-applied to the area of a steel plate where perforation is desired.

8. The method of claim 1 in which the perhalogenyl fluoride is combined with a hypergolic ignition promoting material selected from the group consisting of halogen fluoride, fluorine and chloryl fluoride in the ratio range of about 99:1 to about 1:5 parts by weight of perhalogenyl fluoride to the hypergolic ignition promoting material.

9. The method of claim 8 in which the halogen fluoride is chlorine trifluoride.

10. The method of claim 8 in which the halogen fluoride is bromine pentafluoride.

11. The method of claim 8 in which the halogen fluoride is bromine trifluoride.

12. The method of claim 8 in which the ignition promoting material is chloryl fluoride.

13. The method of claim 8 in which the ignition promoting material is fluorine.

References Cited in the file of this patent
UNITED STATES PATENTS

| | | |
|---|---|---|
| 1,594,182 | Millward | July 27, 1926 |
| 2,421,649 | Priest et al. | June 3, 1947 |
| 2,642,656 | Grosse | June 23, 1953 |
| 2,918,125 | Sweetman | Dec. 22, 1959 |

OTHER REFERENCES

Industrial and Engineering Chemistry, vol. 39, No. 3, March 1947, pp. 431, 433, "Hydrogen Fluoride Torch," by Homer F. Priest and Aristid V. Grosse.

Fluorine and Its Compounds, by Haszeldine and Sharp, published by John Wiley and Sons, Inc., New York, N.Y., 1951, pp. 47 and 48.

Comprehensive Inorganic Chemistry, vol. III (by Sneed, Maynard and Brasted), published by D. Van Nostrand Co., Inc., New York, N.Y., 1954, pp. 20–29.